(12) United States Patent
McCarthy (10) Patent No.: US 8,901,405 B1
(45) Date of Patent: Dec. 2, 2014

(54) ELECTRONIC PIANO TRAINING DEVICE

(71) Applicant: Kevin M. McCarthy, Seattle, WA (US)

(72) Inventor: Kevin M. McCarthy, Seattle, WA (US)

(73) Assignee: McCarthy Music Corp., Seattle, WA (US)

( * ) Notice: Subject to any disclaimer, the term of this patent is extended or adjusted under 35 U.S.C. 154(b) by 0 days.

(21) Appl. No.: 13/973,861

(22) Filed: Aug. 22, 2013

(51) Int. Cl.
*G09B 15/08* (2006.01)
*A63J 17/00* (2006.01)
*G09B 15/00* (2006.01)

(52) U.S. Cl.
CPC .................................. *G09B 15/003* (2013.01)
USPC .......................... 84/478; 84/423 R; 84/464 A (58) Field of Classification Search
USPC ............................................................ 84/478
See application file for complete search history.

(56) References Cited

U.S. PATENT DOCUMENTS

| | | | | |
|---|---|---|---|---|
| 3,827,330 | A * | 8/1974 | Ward .............................. | 84/472 |
| 5,394,784 | A * | 3/1995 | Pierce et al. ................ | 84/464 A |
| 5,557,055 | A * | 9/1996 | Breitweiser, Jr. .............. | 84/478 |
| 5,656,789 | A * | 8/1997 | Nakada et al. ............. | 84/477 R |
| 5,907,115 | A * | 5/1999 | Matsunaga et al. ......... | 84/477 R |
| 6,037,534 | A | 3/2000 | Yasutoshi et al. | |
| 6,337,433 | B1 | 1/2002 | Nishimoto | |
| 6,348,649 | B1 * | 2/2002 | Chen et al. .................. | 84/477 R |
| 6,407,324 | B1 * | 6/2002 | Hulcher ......................... | 84/478 |
| 6,410,836 | B2 | 6/2002 | Takahashi | |
| 6,515,210 | B2 * | 2/2003 | Shibukawa ................ | 84/477 R |
| 7,361,829 | B2 | 4/2008 | Uehara | |
| 8,008,563 | B1 * | 8/2011 | Hastings .................... | 84/479 A |
| 2011/0283867 | A1 * | 11/2011 | Ihara ............................... | 84/478 |
| 2013/0068086 | A1 | 3/2013 | Mittelstadt et al. | |

OTHER PUBLICATIONS

Casio LK-170, LK-175, LK-260 User's Guide, Retrieved Jul. 21, 2014 10:41AM PDT, http://support.casio.com/en/manual/manualfile.php?cid=008016042.

Yamaha Digital Keyboard EZ-220 Owner's Manual, Retrieved Jul. 21, 2014 10:45AM PDT, http://download.yamaha.com/api/asset/file/?language=en&site=usa.yamaha.com&asset_id=55346.

* cited by examiner

*Primary Examiner* — Christopher Uhlir (74) *Attorney, Agent, or Firm* — Davis Wright Tremaine LLP (57) ABSTRACT

Described is an electronic piano training device. Embodiments of the electronic piano training device include illuminated keys on a keyboard to convey information to a user. The information may be static but selectable, such as different colors for different hands and/or events. Alternatively, the information my be programmatically alterable, such as which color to use for which hand, and the like. Color themes may be used to define multiple colors for use to convey greater information.

20 Claims, 8 Drawing Sheets

ELECTRONIC PIANO TRAINING DEVICE

SUMMARY OF THE INVENTION WITH BACKGROUND INFORMATION

Learning to play the piano has always been a difficult and time consuming endeavor. The industry has developed a number of devices intended to help teach users to play the piano. However, none of the existing devices have produced an acceptable solution.

For example, U.S. Patent Publication 2013/0068086 discusses a piano learning system for tablets and touchscreen devices. The system described reveals nothing except the well-known use of Light Emitting Diodes to illuminate keys. Nothing particularly novel regarding the lighting of keys is described. In fact, the '8086 Application states explicitly that "[t]he method for a microprocessor 28 to control LEDs is well established and not repeated here." '8086 at page 2. Thus, nothing novel regarding lighting is disclosed.

In another example, U.S. Pat. No. 6,037,534 discusses the use of lighting to indicate to a user which key should be played. The '534 patent is long on description yet short on disclosure. Little if anything is taught except the use of lights to indicate which key should be played.

U.S. Pat. No. 6,410,836 discusses a clever system whereby LEDs are illuminated from an uppermost light emitting element farthest from the key toward the key at a timing (t-n) going back an arbitrary time period "n" from that timing "t." In other words, keys are illuminated toward the key to be struck. Other than an interesting gimmick, nothing of interest to the piano student is taught by the '836 patent.

U.S. Pat. No. 6,407,324 is typical of existing systems which merely use lights to indicate whether a key should be struck with either the left hand or the right hand. Systems made in accordance with the teachings of the '324 patent are limited to the use of two colors to distinguish between the user's right hand or left hand. Little else, if anything, is disclosed related to the use of colors in the training system.

Existing systems for teaching the piano leave much to be desired, and a truly effective piano training device has eluded those skilled in the art.

Embodiments of the present invention are directed to an electronic piano training device that incorporates dynamically controllable lighting integrated into the keys of a keyboard. The dynamically controllable lighting may take the form of broad-spectrum Light Emitting Diodes (LEDs) that are controlled by a programmable computing system.

The LEDs are electronic components that are capable of radiating in multiple (if not a continuous spectrum) of operating modes where each operating mode is associated with a different color. The programmable computing system includes a User Interface (UI) and a control module. The control module is configured to activate signals to excite the LEDs to illuminate them in each of the multiple (if not continuous spectrum) operating modes. In this way, the control module is operative to cause the LEDs to radiate in a multiplicity of colors.

The LEDs are integrated with keys on a keyboard such that the light emitted by a particular LED is visible in conjunction with a particular key. Each LED is controlled by a controller which is configured to cause each LED to illuminate in any one or more of multiple colors according to a color theme.

The UI enables a user to select from one or more options that may affect a color theme implemented by the piano training device. Alternatively, the piano training device may be pre-configured with alternative color themes that are implemented in the course of using the piano training device.

In yet another alternative, a music manifest may be provided which programmatically defines a color theme to be implemented while using the piano training device.

The teachings and advantages of the invention will become more readily apparent from a study of the several included drawings in conjunction with the following detailed description of embodiments.

DETAILED DESCRIPTION OF PREFERRED EMBODIMENTS

Briefly described, the invention is directed to an electronic piano teaching device. Generally stated, an electronic piano teaching device is provided that includes broad-spectrum LEDs which are dynamically controllable. Each LED is capable of illuminating a broad spectrum of colors.

Illustrative Computing Environment

Figure 1:
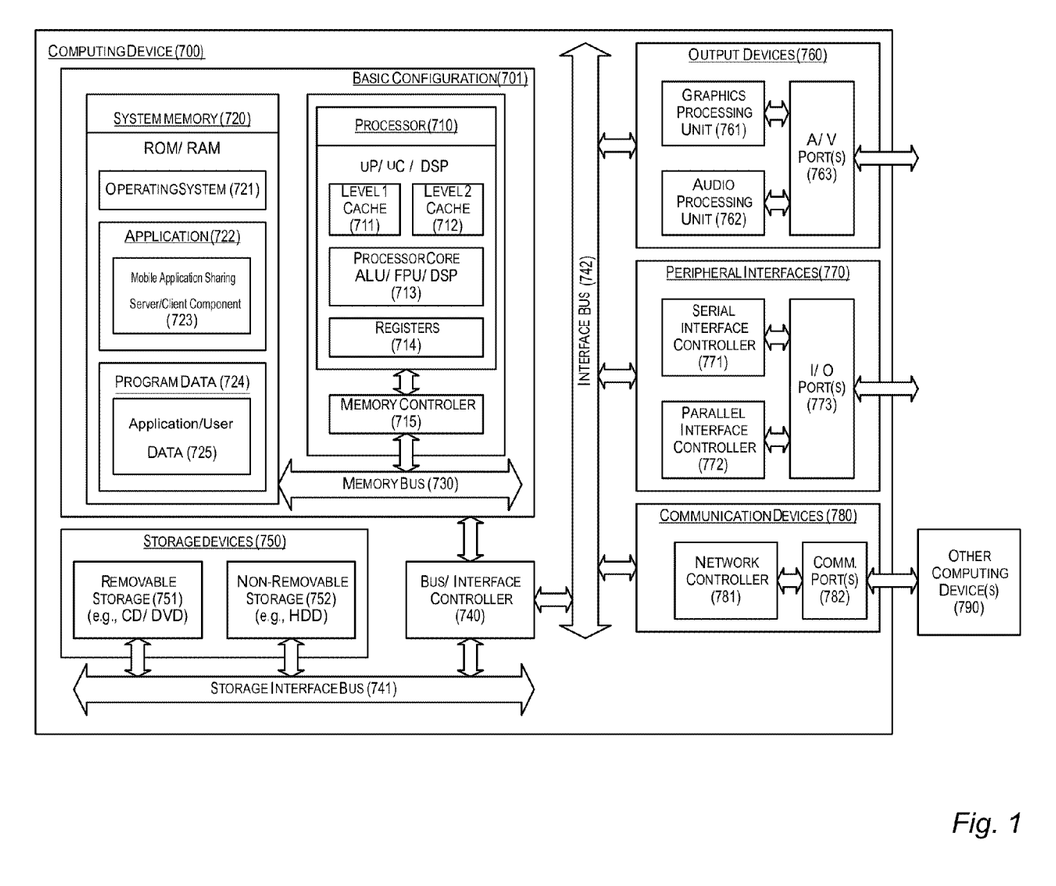
FIG. 1 is a functional block diagram of a computing environment in which embodiments of the present invention may be implemented.

FIG. 1 is a block diagram illustrating an example computing device 700 that may be used to implement one or more embodiments of a software system for beaming applications between mobile devices in a peer-to-peer environment, in accordance with the present disclosure. In a very basic configuration 701, computing device 700 typically includes one or more processors 710 and system memory 720. A memory bus 730 can be used for communicating between the processor 710 and the system memory 720.

Depending on the desired configuration, processor 710 can be of any type including but not limited to a microprocessor (µP), a microcontroller (µC), a digital signal processor (DSP), or any combination thereof. Processor 710 can include one more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 typically includes an operating system 721, one or more applications 722, and program data 724. Application 722 may include a component 723 specially configured for beaming or sharing applications between mobile devices in a peer-to-peer environment, in accordance with the present disclosure. Program Data 724 may include applicant or organizational data 725 that may be useful as has been further described above. In some embodiments, application 722 can be arranged to operate with program data 724 on an operating system 721 such that operation of a system may be facilitated on general purpose computers.

Computing device 700 can have additional features or functionality, and additional interfaces to facilitate communications between the basic configuration 701 and any required devices and interfaces. For example, a bus/interface controller 740 can be used to facilitate communications between the basic configuration 701 and one or more data storage devices 750 via a storage interface bus 741. The data storage devices 750 can be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media (or computer-readable medium) includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include an interface bus 742 for facilitating communication from various interface devices (e.g., output interfaces, peripheral interfaces, and communication interfaces) to the basic configuration 701 via the bus/interface controller 740. Example output devices 760 include a graphics processing unit 761 and an audio processing unit 762, which can be configured to communicate to various external devices such as a display or speakers via one or more A/V ports 763. Example peripheral interfaces 770 include a serial interface controller 771 or a parallel interface controller 772, which can be configured to communicate with external devices such as input devices (e.g., keyboard, mouse, pen, voice input device, touch input device, etc.) or other peripheral devices (e.g., printer, scanner, etc.) via one or more I/O ports 773.

An example communication device 780 may include a network controller 781, which can be arranged to facilitate communications with one or more other computing devices 790 over a network communication via one or more communication ports 782. Communication ports 782 may further include components configured to communicate over a near-area network. Examples of such communication ports 782 may include wi-fi, bluetooth, and other near-field communication protocols.

The communication link is one example of a communication media. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a small-form factor portable (or mobile) computer such as a cell phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations.

Specific Embodiments of the Invention

FIGS. 2-8 illustrate in greater detail specific embodiments of an electronic piano training device which incorporate the teachings of the invention. The several embodiments shown in FIGS. 2-8 are provided for illustrative purposes only, and are not exhaustive of the many embodiments that the invention may take. Accordingly, these embodiments are for discussion purposes only, and additional embodiments are envisioned.

Figure 2:
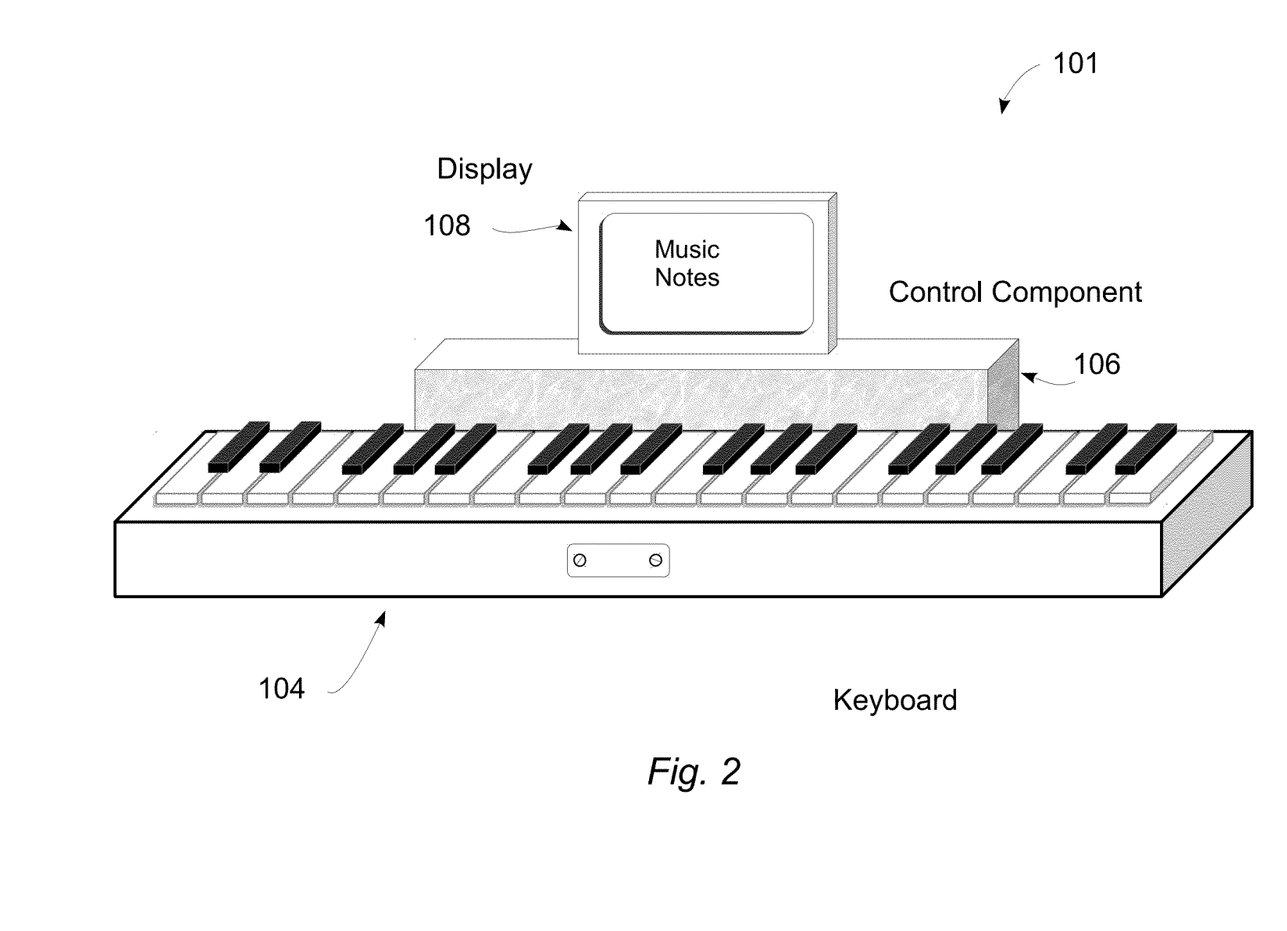
FIG. 2 is a conceptual drawing generally illustrating a piano training device constructed in accordance with the teachings of the present invention.

FIG. 2 is a conceptual drawing generally illustrating one piano training device 101 constructed in accordance with the teachings of the present invention. The piano training device of FIG. 2 illustrates how one particular embodiment may be implemented. In this embodiment, a keyboard 104 is coupled to a control component 106 to enable the piano teaching function.

The keyboard may take many forms. For example, the keyboard may be a special purpose device developed particularly for use in this embodiment. Alternatively, the keyboard may be a MIDI keyboard adapted for use in this embodiment. In still another alternative, the keyboard may be a synthesizer adapted for use in this embodiment.

More specifically, embodiments of the invention may be implemented using any type of keyboard adaptable to the teachings of the invention. By way of example, and not limitation, portable keyboards typically include relatively little programmatic functionality, such as an integrated processing unit and a sound synthesizer. Midi controllers make use of a separate processing unit contained within an external device, such as a PC or tablet computer, but typically rely on an external device to create the actual sound. Synthesizers are generally more higher-end devices and frequently include fully weighted keys, custom internal processors, more configurable options, and the like. It should be appreciated that embodiments of the invention can be implemented using any one or more of these types of keyboards, or may be implemented in any other type of keyboard which has yet been developed.

In this specific implementation, each key on the keyboard is embedded with a respective multi-color LED. In one specific implementation, each key is constructed of a semi-transparent material through which the light emitted by an LED is visible. Each LED may be a Red/Green/Blue (RGB) LED that is capable of emitting a broad—if not full—spectrum of colors.

Figure 5:
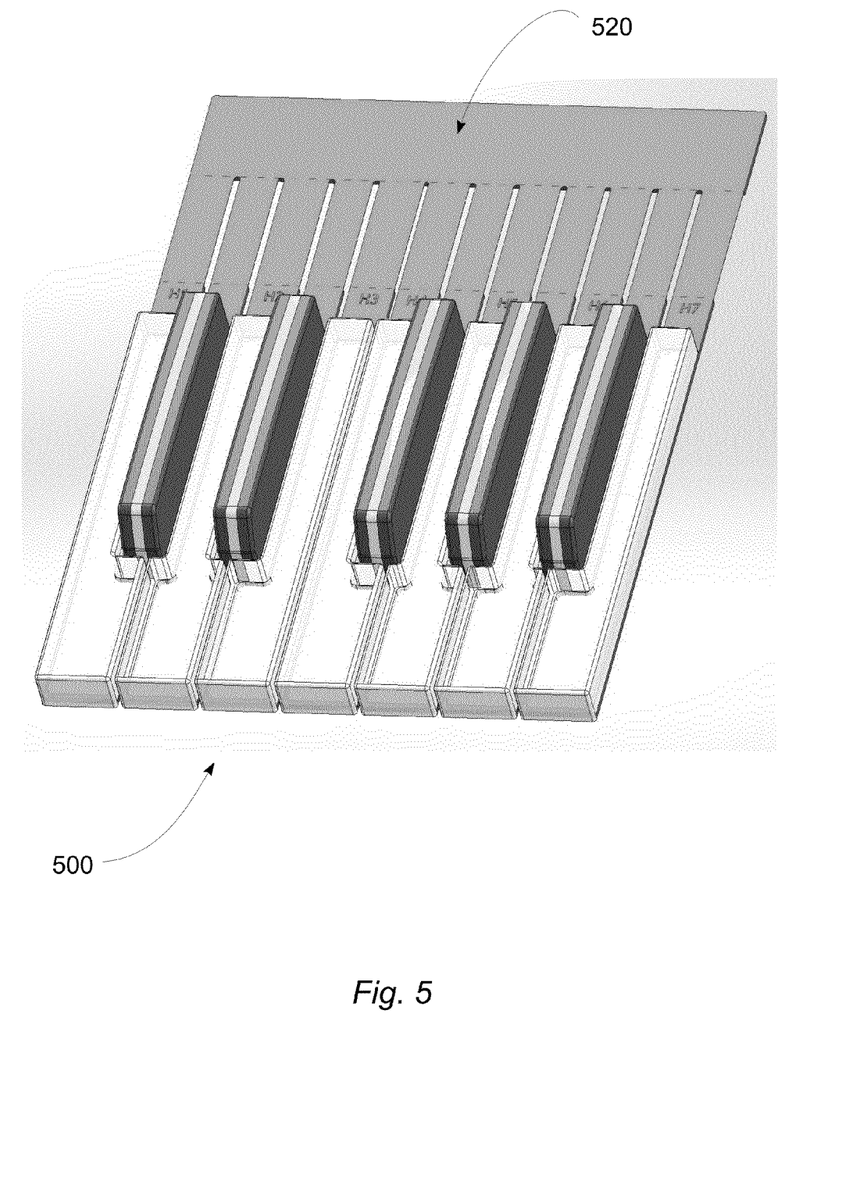
FIG. 5 is a functional diagram generally illustrating the use of electroluminescent material in conjunction with a keyboard to enable any one of multiple colors to be selectively illuminated in association with one particular key of the keyboard.

For example, turning briefly to FIG. 5, the keys 500 of the keyboard are made of a relatively transparent material, such as plastic, with LEDs 520 layered below the keys. In this embodiment, the LEDs are RGB LEDs capable of emitting nearly full-spectrum lighting based on the particular signal input. The RGB LEDs of the device are capable of illuminating in any one or more of many different colors. The nature of RGB LEDs is such that the respective signals on each of the red, green, and/or blue input triggers changes the output color of the LED almost continuously along the spectrum of visible colors. In other words, by controlling the relative signals to each RGB LED, almost any color may be created.

Although the embodiments described herein include RGB LEDs, it will be appreciated that other types of LEDs or electroluminescent material may be used in other implementations, such as, for example, organic LEDs (OLEDs), phosphor-based LEDs, or quantum dot LEDs, just to name a few.

Returning again to FIG. 2, a control component 106 is coupled to the keyboard to enable a user to control the operation of the piano training device. The control component may include a display 108 for displaying at least a musical score with notes that are to be played on the keyboard. In this embodiment, the control component includes programming and/or hardware to control the illumination of the keys on the keyboard in accordance with the musical score. In other words, as each note of the musical score occurs on the display, the appropriate keys on the keyboard are illuminated so the player will visually detect which keys make the note, among other features.

It should be noted that the piano training device illustrated in FIG. 2 includes three distinct components: a keyboard, a control component, and a display. However, two or more of those components may be integrated as fewer than three distinct components without deviating from the spirit of the invention. For example, the display and the control component could be integrated into a single unit, such as a laptop computer or special purpose computing device, to which the keyboard attaches. Alternatively, the display, the control component, and the keyboard may all be integrated into a single unit. Conversely, the functionality of the three main components may be distributed over more than three components. For example, functionality of the control component could alternatively be implemented in two or more computing devices without deviating from the spirit of the invention.

Figure 3:
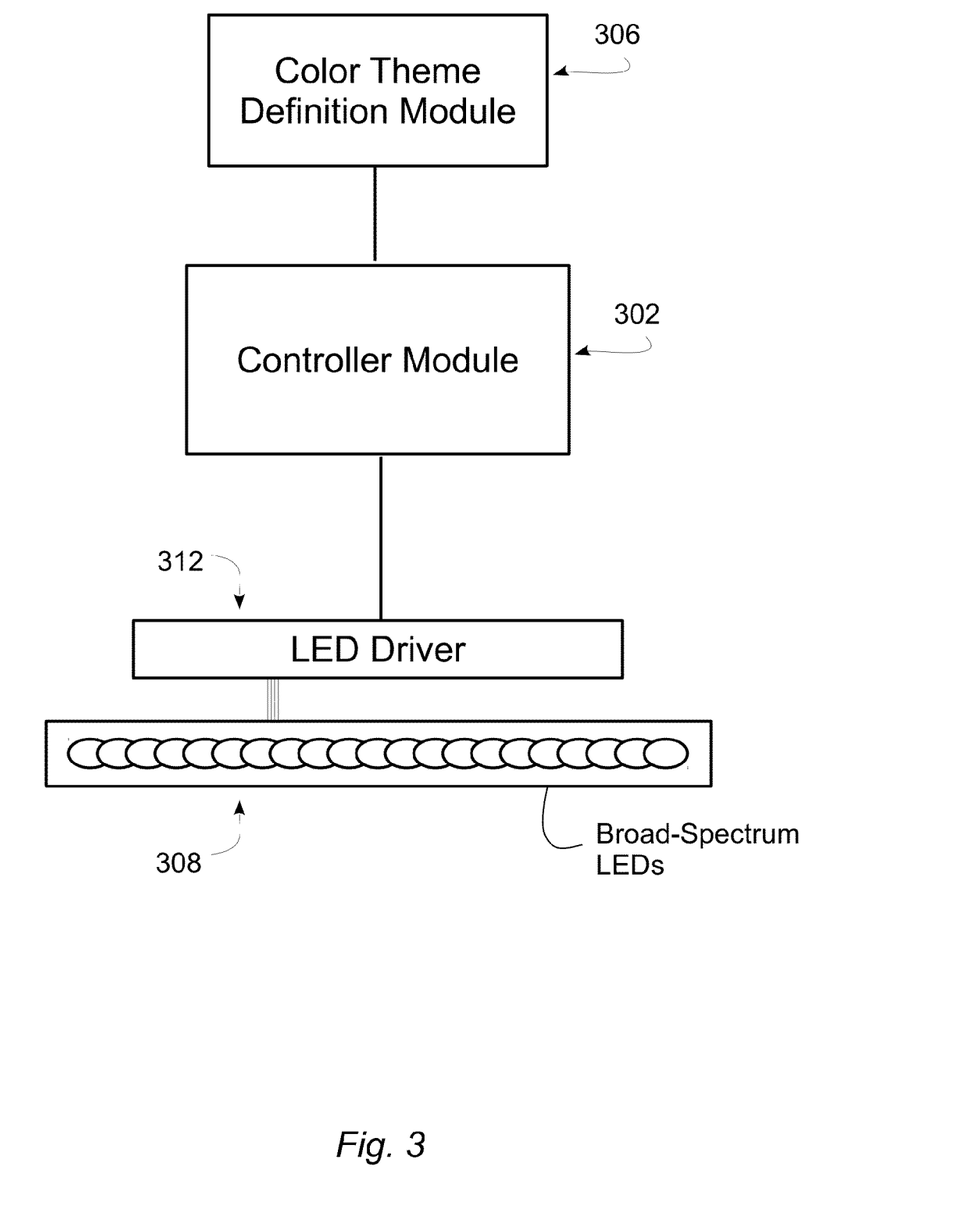
FIG. 3 is a functional block diagram illustrating the major components of one embodiment of an electronic piano teaching device constructed in accordance with the teachings of the present invention.

Turning now to FIG. 3, another embodiment is shown illustrating major functional components of a piano training device. In this embodiment, a controller module 302 is coupled to a color theme definition module 306. In this embodiment, the color theme definition module includes functionality to define particular colors that are displayed on the keys of the keyboard. As described in greater detail below, the color theme definition module includes instructions that define any one or more of multiple colors to be displayed in association with each of the keys of the keyboard based on the particular aspects of the music being played. In other words, the color theme definition module of this embodiment defines a color scheme that is used by the piano training device. One specific example of an implementation of the color theme definition module is illustrated in FIG. 4 and described below.

The controller module is a computing unit that is programmed to control the keyboard LEDs 308 such that the appropriate color is displayed by each LED in accordance with the color theme defined by the color theme definition module. For example, the controller module may be a general or special purpose computing device with special software code to trigger various colors to be illuminated by any one or more of the LEDs. The controller module is in operative communication with the color theme definition module such that as notes are encountered for a musical score, appropriate LEDs are driven with colors that conform to a color theme definition being interpreted by the color theme definition module.

As the controller module encounters each color of a particular color theme, the controller module causes each LED to illuminate the appropriate color using the LED driver 312. In this implementation, the LED driver is a component whose function is to drive the appropriate signal to each LED to cause that particular LED to illuminate the appropriate color. LED driver circuitry is known in the art.

Figure 4:
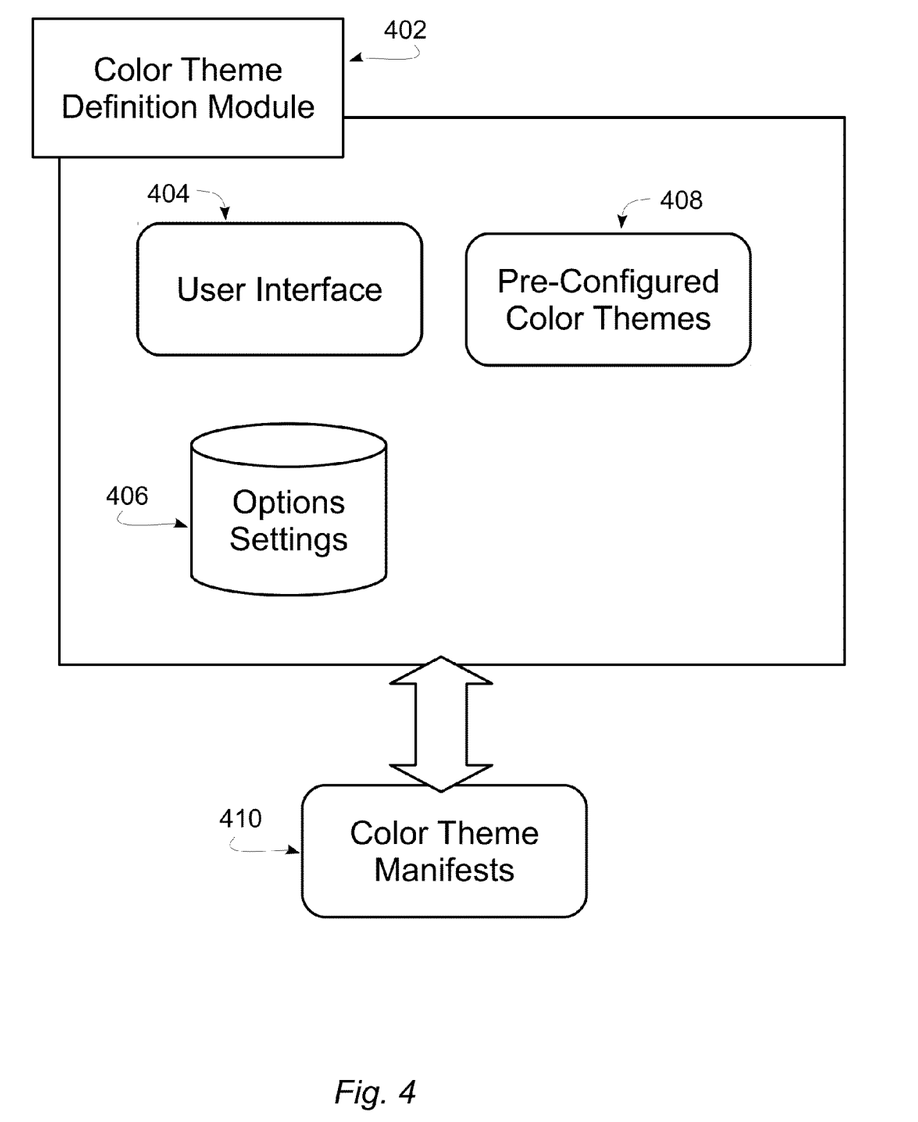
FIG. 4 is a illustrative screen displays that may be presented by preferred embodiments of the present invention.

Turning now to FIG. 4, a sample color theme definition module 402 is shown which may be used in various implementations. The color theme definition module may implement one or more of several different options for defining a color theme. In one implementation, the color theme may be set by a user interface 404 that allows a user to select from one or more options in an options settings database 406. For example, pre-set color themes may be stored in the color theme definition module that the user can select. Alternatively, a set of pre-configured color themes 408 may be stored in the color theme definition module and programmatically selected by the control module without user input.

In yet another alternative, one or more color theme manifests 410 may be provided to the color theme definition module from, perhaps, an external source. In one example, an external music file may be provided to the control module which includes a color theme for use with a particular song, or the like. In this implementation, the music file defines a set of colors that should be illuminated in conjunction with the play of one or more associated songs. Each of the songs may be defined by the user of the piano training device, or, alternatively, the songs may be defined by an externally acquired music file.

Figure 6:
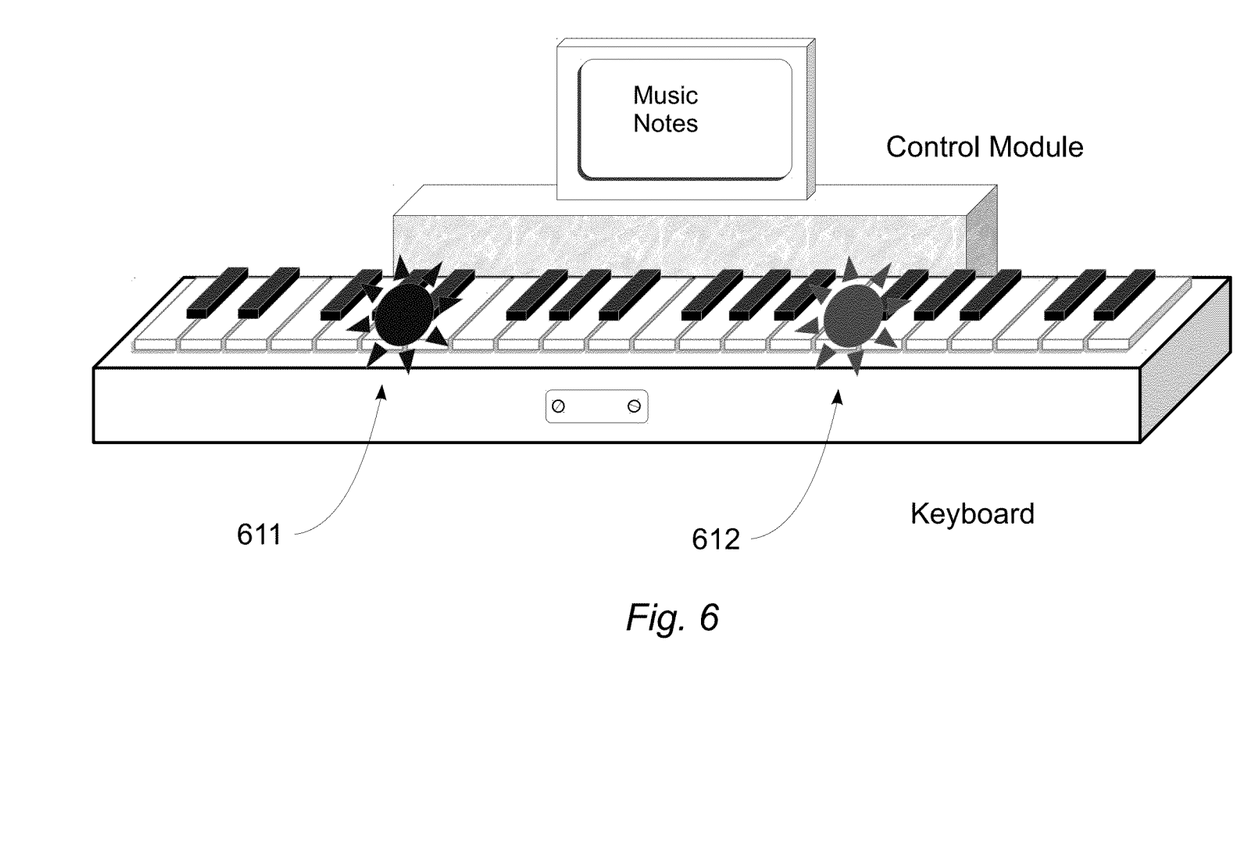
FIGS. 6-8 are functional diagrams generally illustrating the operation of embodiments which illuminate keys of a keyboard with multiple colors of light in a selective manner to convey various functions to a user.
Figure 7:
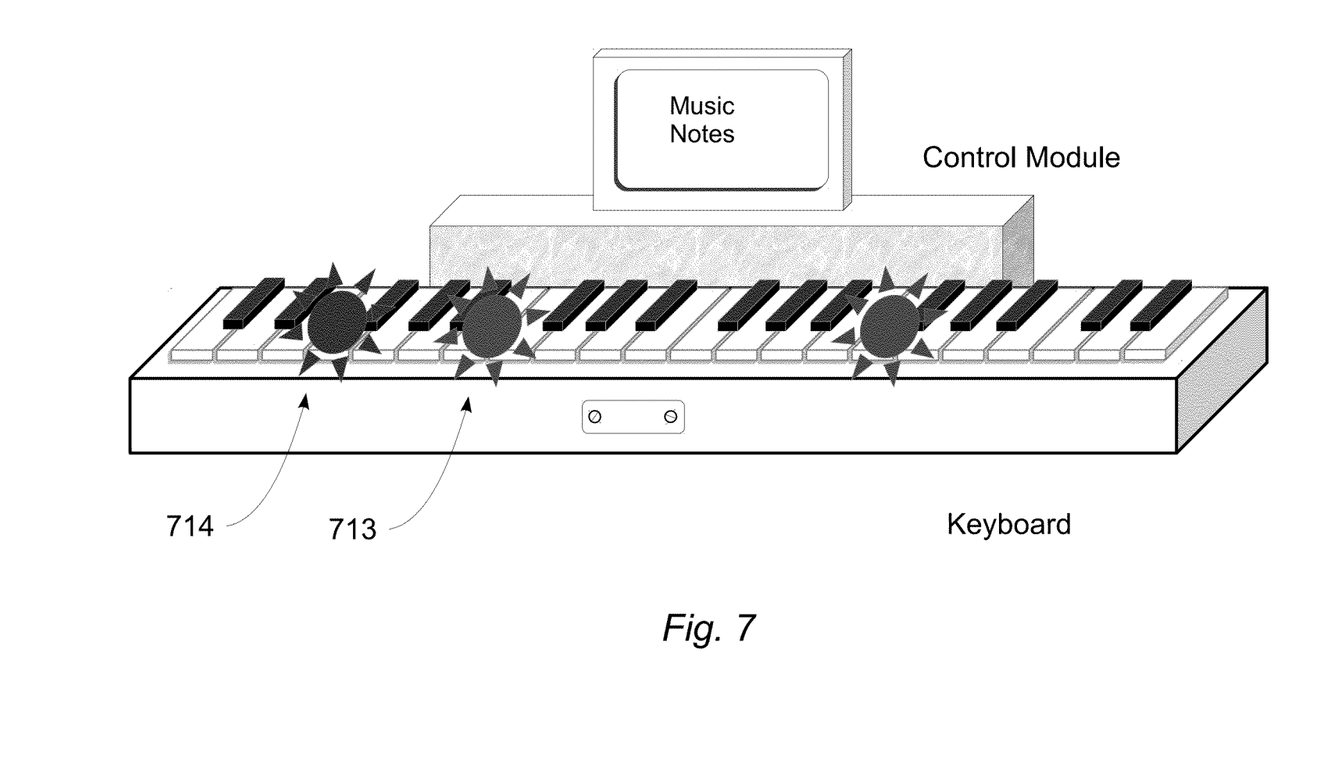
Figure 8:
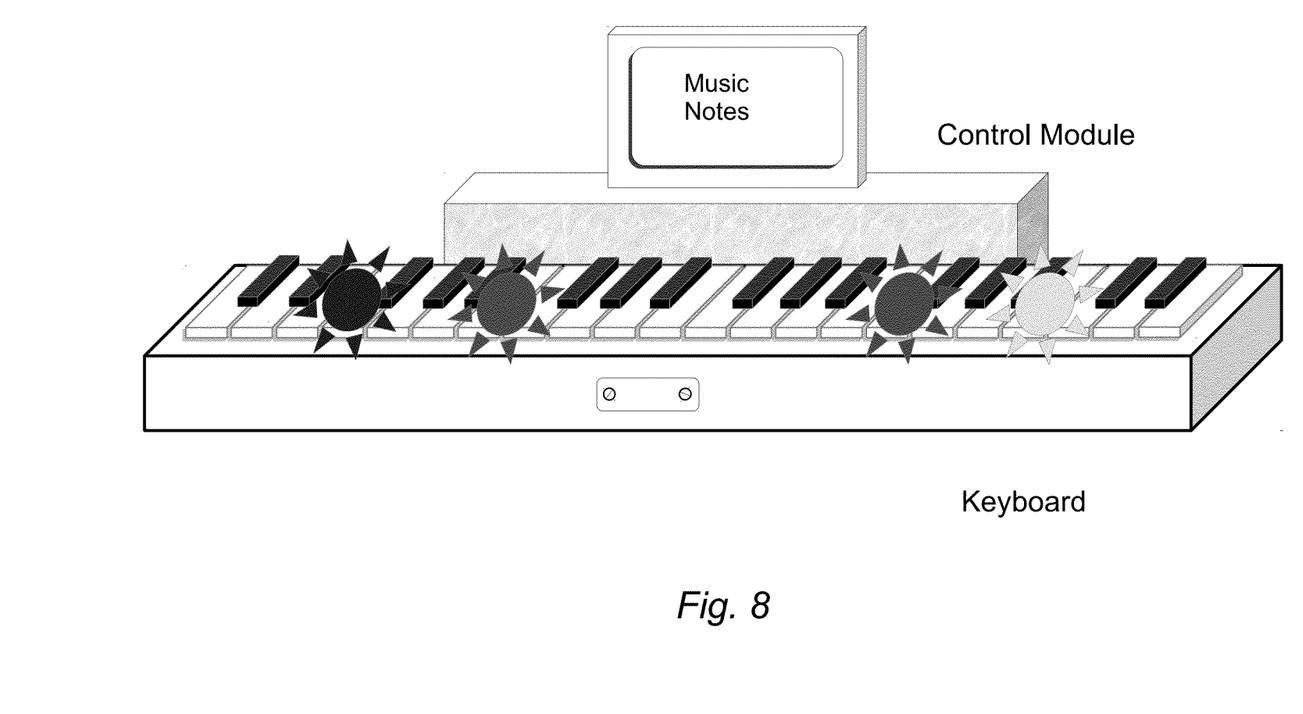

Turning now to FIGS. 6-8, alternative embodiments are illustrated to demonstrate various operating modes of implementations of a piano training device with programmatically alterable color schemes. More specifically, as shown first in FIG. 6, various LEDs are illuminated below the keys of a keyboard to indicate which of several functions a user should perform. For example, in FIG. 6, a blue light 611 and a green light 612 are illuminated to show that the user should use one hand to strike one key and the other hand to strike the other key. In this example, the blue light indicates which key should be stricken with the user's left hand, and the green light indicates which key should be stricken with the user's right hand.

In FIG. 7, the embodiment illustrates that one key is illuminated red 713 to indicate that the wrong key was struck. In other words, in addition to illuminating the proper keys that should be struck, this embodiment also illuminates with a different color which key was stricken in error, thus aiding the user to identify the cause of error. In addition, yet another key 714 may be illuminated with a different color, such as purple (for example) to illustrate the next key to be struck.

In FIG. 8, yet another embodiment is shown where a color theme manifest has been provided to the piano training device in which a series of keys should be struck in accordance with a series of particular colored lights. More specifically, in this particular illustrative implementation, a color theme manifest may be installed that causes the keys of the keyboard to flash a series of lights in a certain order that must be followed by the user. In other words, a number of different colors (e.g., red, green, blue, and yellow) may be illuminated on the keyboard in a sequence which changes with each round. A round consists of the control module lighting up one or more keys in a random order, after which the user must reproduce that order by pressing the appropriate keys. As play progresses, the number of keys to be pressed may be increased. Alternatively, the location of each key to be pressed may be altered. This embodiment may be used to help train the user for speed and color identification. This implementation is reminiscent of the Simon game distributed by Milton Bradley.

The foregoing embodiments are shown to illustrate the numerous options that are made available through the use of multicolor illumination of the keys on a keyboard in a piano training device. Other embodiments of the invention may implement countless different variations of the invention. For example, embodiments may be implemented which use one color to indicate keys struck by the right hand, another color to indicate keys struck by the left hand, and a third color to indicate that the wrong key was struck.

In another implementation, a different color may be used to indicate which key should be struck after the currently-active key. For example, if blue and green are used to illuminate keys that should be struck now by the right and left hands to make a note, the colors purple and yellow could be used to illuminate the keys that will need to be struck next to make the following note.

In still another implementation, a music file manifest may be used to define colors for each note of the score. For example, the manifest may set a different color for each note, or groups of notes, throughout the score. Such an embodiment could be used to help convey, for example, how much force to use when striking a key for effect, e.g., softer lights for lighter notes, and brighter lights for stronger notes.

Although the invention has been described in conjunction with several described embodiments, other aspects and embodiments will be apparent to those skilled in art. The various embodiments disclosed herein are for purposes of illustration and are not intended to be limiting, with the true scope and spirit of the invention being limited only by the appended claims.

The invention claimed is:

1. A piano training device, comprising:
a plurality of electroluminescent light sources;
a keyboard having a plurality of keys, each key of the plurality of keys being associated with a particular note and having an upper surface strikeable for playing the particular note, the upper surface having a first portion oriented toward a player of the piano training device when the piano training device is used by the player and a second portion oriented away from the player of the piano training device when the piano training device is used by the player, each key of the plurality of keys having an associated electroluminescent light source of the plurality of electroluminescent light sources, wherein:
each electroluminescent light source of the plurality of electroluminescent light sources is operative to illuminate at least the second portion of its respective key with at least three different colors in response to at least three different signals; and
a controller coupled to the keyboard and configured to provide respective signals to each of the electroluminescent light sources of the plurality of keys, the controller being further configured to alter an operative color for each of the electroluminescent light sources of the plurality of keys selected color theme provided to the controller, the selected color theme being from a set of pre-stored color theme variations, being modifiable, and programmatically modifiable color theme provided to the controller, the color theme associating at least three events each with a different respective color from at least three colors, wherein:
the operative color for each of the electroluminescent light sources of the plurality of electroluminescent light sources is alterable by the controller to be any of the at least three colors based at least in part on the color theme and a current state of a musical score; and
the controller is able to cause each electroluminescent light source of the plurality of electroluminescent light sources to be illuminated in each color of the at least three colors such that, for each event of the at least three events, the electroluminescent light source is illuminated in a color associated with the event by the color theme.

2. The piano training device recited in claim 1, further comprising a display configured to show at least one note of a musical score to play on the keyboard.

3. The piano training device recited in claim 1, wherein the controller further comprises a color theme definition module, the color theme definition module being used to establish the color theme in operation, the color theme in operation capable of specifying three different colors for at least three different events.

4. The piano training device recited in claim 3, wherein the color theme definition module implements a user interface to allow selection of the color theme from various optional color themes, each color theme defining a set of colors, each color in the set being associated with a different event.

5. The piano training device recited in claim 4, wherein the different events comprise at least a right hand note, a left hand note, and an incorrect key.

6. The piano training device recited in claim 3, wherein the color theme definition module includes pre-configured color themes for programmatic selection by the controller, each color theme defining a set of colors, each color in the set being associated with a different event.

7. The piano training device recited in claim 6, wherein the different events comprise at least a right hand note, a left hand note, and an incorrect key.

8. The piano training device recited in claim 1, wherein the electroluminescent light source is a light emitting diode.

9. The piano training device recited in claim 1, wherein each electroluminescent light source is operative to illuminate the first portion of the upper surface when illuminating the second portion.

10. The piano training device recited in claim 1, wherein the first portion of the upper surface and second portion of the upper surface combine to form the entire user-strikeable upper surface of their corresponding key.

11. The piano training device recited in claim 1, wherein the color theme specifies at least one color for a first event that, relative to a current state of performance of a musical score, has already occurred and a second event that, relative to the current state of performance of the musical score, has yet to occur.

12. The piano training device recited in claim 11, wherein the first event is an incorrectly played key and the second event is a key to be played next according to the musical score.

13. The piano training device recited in claim 1, wherein the controller is configured to cause illumination of three different electroluminescent light sources simultaneously as a result of a first event occurring, a second event occurring, and a third event occurring.

14. The piano training device recited in claim 1, wherein the controller is configured to provide at least some of the respective signals in accordance with an amount of force to be used for key strikes.

15. The piano training device recited in claim 1, wherein the color theme specifies a first color for left-hand notes and a second color for right-hand notes and a third color for incorrect notes.

16. The piano training device recited in claim 14, wherein the controller is configured to provide a first signal to a particular key of the plurality of keys when the particular key corresponds to a left-hand note and a second signal to the particular key when the particular key corresponds to a right-hand note.

17. The piano training device recited in claim 1, wherein the color theme specifies multiple events based at least in part on a current position in performance of a musical score.

18. The piano training device recited in claim 1, wherein the plurality of keys comprise a first subset of keys constructed with a material of a first color and a second subset of keys constructed of a material of a second color, at least one of the material of the first color or material of the second color being transparent or semi-transparent.

19. The piano training device recited in claim 1, wherein the at least three events are each capable of occurring on multiple keys of the plurality of keys.

20. The piano training device recited in claim 1, wherein, for each key of the plurality of keys, the at least three events comprise:
   a first event that occurs based at least in part on the current state of the musical score and as a result of the key having been struck; and
   a second event that occurs based at least in part on the current state of the musical score and without the key having been struck.

* * * * *